Sept. 23, 1958 C. W. CRUMB 2,853,193
ROTARY FILTER PROVIDED WITH TILTING FILTRATE PANS
Filed Aug. 15, 1955 2 Sheets-Sheet 1
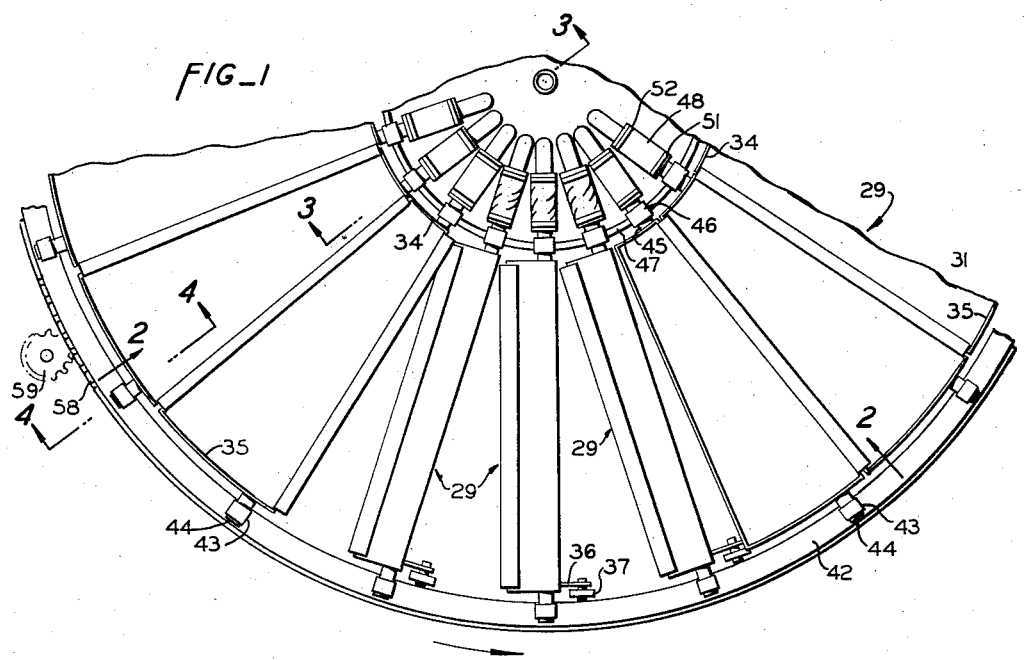
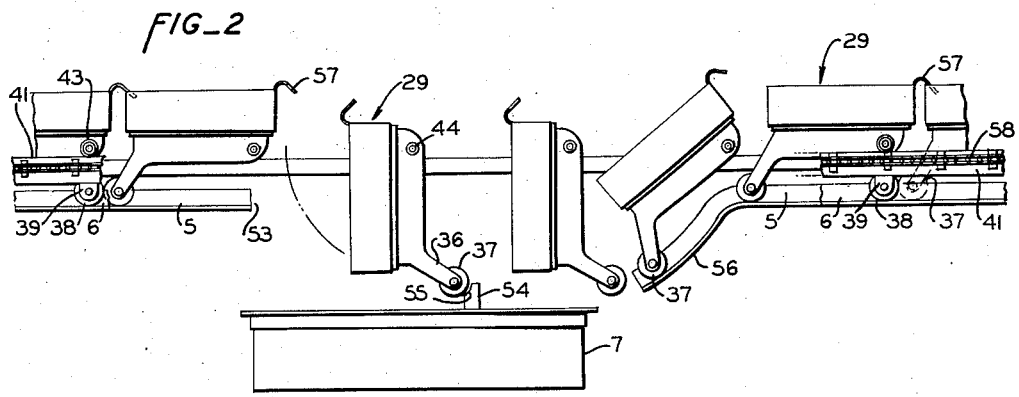
INVENTOR.
CARLTON W. CRUMB
BY
ATTORNEYS Sept. 23, 1958 C. W. CRUMB 2,853,193
ROTARY FILTER PROVIDED WITH TILTING FILTRATE PANS
Filed Aug. 15, 1955 2 Sheets-Sheet 2
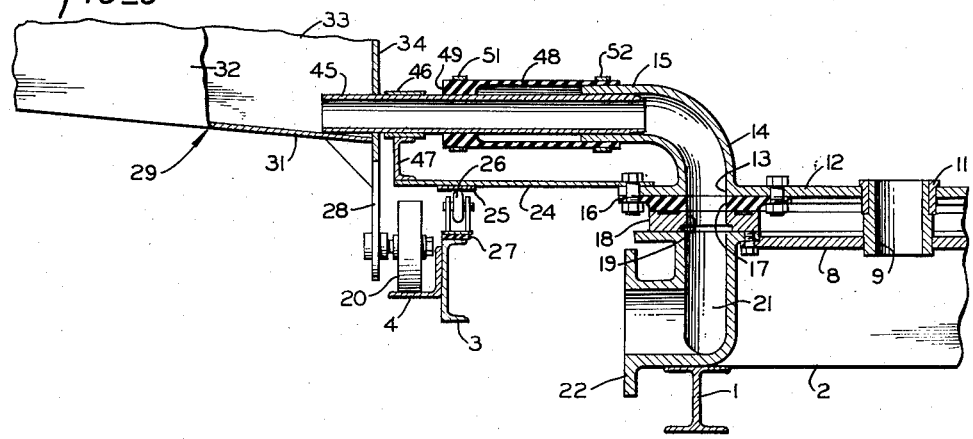
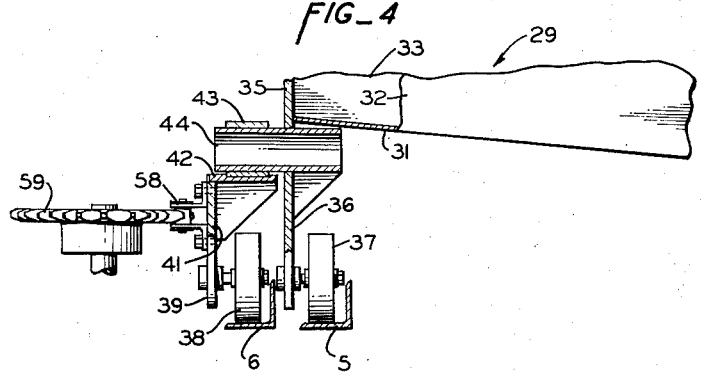
INVENTOR.
CARLTON W. CRUMB
BY
ATTORNEYS United States Patent Office 2,853,193
Patented Sept. 23, 1958

2,853,193

ROTARY FILTER PROVIDED WITH TILTING FILTRATE PANS

Carlton W. Crumb, Greenwich, Conn., assignor to Dorr-Oliver Incorporated, Stamford, Conn., a corporation of Delaware Application August 15, 1955, Serial No. 528,179

6 Claims. (Cl. 210—328)

This invention relates to and in general has for its object the provision of a sectionalized continuous rotary filter provided with tilting filtrate pans, compartments or sections whereby said sections can be discharged under the influence of gravity.

The cycle of operation of all types of continuous sectionalized rotary filters is controlled by an automatic filter valve including a valve member arranged to rotate with the filter sections against a stationary valve body. To this end, each filter section communicates with the valve member through suitable conduits. In the case of filters of the fixed-pan type, these conduits can take the form of rigid piping devoid of movable joints. However, where tilting pans are resorted to, the pans must be connected to the piping through rotary water-tight joints. Normally, these joints require packing of some sort or other, and this gives rise to considerable servicing problems. Here it should be noted that it is not unusual to divide a continuous filter into eighteen or more sections, each of which requires a movable joint.

More specifically, one of the objects of this invention is the provision of a connection between a tilting filter pan and its piping, including a pair of axially aligned, telescopically disposed pipe sections connected to each other by a hose section sealed at one end to one of the pipe sections and sealed at its other end to the other of said pipe sections, said hose section being capable of twisting so as to permit its associated pan to tilt through an angle of 90° or more.

Another object of this invention is the provision of a tilting-pan type of filter wherein the trailing edges of each pan are supported by an interrupted track and wherein their leading edges are journaled in a rotary filter pan carrier or frame.

The invention possesses other advantageous features, some of which, with the foregoing, will be set forth at length in the following description where those forms of the invention which have been selected for illustration in the drawing accompanying and forming a part of the present specification, are outlined in full. In said drawings, one form of the invention is shown, but it is to be understood that it is not limited to such form, since the invention as set forth in the claims may be embodied in other forms.

Referring to the drawings:

Fig. 1 is a fragmentary top plan view of a rotary table tiltable pan filter embodying the objects of my invention.

Fig. 2 is a side elevation development taken on the line 2—2 of Fig. 1.

Fig. 3 is a vertical section on the section line 3—3 of Fig. 1, and

Fig. 4 is a vertical section taken on the section line 4—4 of Fig. 1.

The table filter illustrated in these various figures includes a stationary frame comprising rails 1 for supporting a fixed valve body 2, outer circular structural steel trunnion tracks 5 and 6, and a fixed cake-receiving hopper 7 located at the discharge zone of the filter, that is, the point at which the filter pans are to be upset or tilted.

Bridging the valve body 2 and fixed thereto is a plate 8 provided with an upwardly extending, stepped, coaxial sleeve bearing 9. Journaled on the bearing 9 is a hub 11 and fixed thereto is a pipe ring 12 provided with a circle of holes 13. Formed on the pipe ring 12 in registration of each of the holes 13 is an elbow 14 merging with a radially extending nipple or filtrate discharge pipe section 15. Bolted to the lower face of the pipe ring 12 is an annular rubber wear plate 16 provided with a circle of holes 17 registering with the holes 13, and arranged to seat on renewable annular face plate 18. The face plate 18 is secured to the upper face of the stationary valve body 2 in any suitable manner and is provided with one or more ports 19 opening into corresponding compartments 21 formed in the valve body, these compartments in turn being in communication with sources of vacuum and air pressure through flanged connections 22. The automatic filter valve thus far described and constituted by the rotary valve member or ring 12, the stationary valve body 2 and their associated parts, operates in a well-known manner successively to subject each of the filter pans to either vacuum or pressure in any desired and predetermined sequence.

Concentrically bolted to the pipe ring 12 is an annular spacing plate 24, and attached to the underside of this plate is an annular shoe or track 25 supported at spaced points by rollers 26 mounted on the circular track 3 through resilient pads 27.

Resting on the track 4 which is welded or otherwise affixed to the track 3 on the outer face thereof, are a plurality of circularly spaced rollers 20, these rollers being mounted on brackets 28 depending from the inner ends of radially extending sector shaped filter pans, compartments or sectors, each generally designated by the reference numeral 29.

Each of the pans 29 includes a bottom 31, side walls 32 and 33, and inner and outer end walls 34 and 35. Depending from each of the pan outer end walls is a bracket 36 and mounted on the lower end of this bracket is a roller 37 arranged to ride on the fixed annular supporting track 5.

Supported by the fixed circular track 6 are a plurality of peripherally spaced rollers 38, each mounted on a bracket 39 depending from a ring 41 coaxial with the bearing sleeve 9. Fixed at peripherally spaced points along the ring 41 are inwardly extending brackets 42, and secured to each of these brackets is a sleeve bearing 43. Each of the bearings 43 is coaxially aligned with one of the nipples or filtrate discharge pipe sections 15 associated with the pipe ring 12. Journaled in each of the sleeve bearings 43 is a hollow stub shaft 44 rigidly secured at its inner end to one of the pans 29 by means of the pan bracket 36.

Welded to and extending through the inner end wall 34 of each of the pans 29 is a pipe section 45 journaled in a bearing sleeve 46, the sleeve 46 being fixed to a channel 47 mounted on the outer edge of the plate 24. Here it should be noted that the pipe section 45 is coaxial with the pipe section 15 and stub shaft 44 and that the adjacent ends of the pipes 15 and 45 are telescopically arranged. It should also be noted that the axis of the pipe section 45 lies adjacent and inwardly of the forward side wall 32 of the pan 29, assuming the filter to be rotating counter-clockwise as viewed in Fig. 1. Otherwise stated, each pan 29 is rotatable or tiltable about a radially extending axis adjacent and slightly inwardly of its leading edge or forward side wall.

Disposed over the overlapping portions of the pipe sections 15 and 45 is a resilient rubber coupling sleeve 48 formed at its inner end 49 with a reduced inner diameter substantially equal to the outer diameter of the pipe section 45. As best shown in Fig. 3, the inner diameter of the inner end of the sleeve 48 is substantially equal to the outer diameter of the pipe section 15. The outer and inner ends of the sleeve 48 are non-rotatably sealed respectively to the pipe sections 45 and 15 by hose clamps, 51 and 52 and by the use of any suitable cement. It will thus be seen that the rotation or tilting of the pans is made possible due to the ability of the sleeve 48 to twist as illustrated in the central portion of Fig. 1. As a result of this construction, the use of gaskets and swivel joint members having sliding and sealing engagement with each other has been avoided. The pipe 45 prevents the sleeve 48 from collapsing when the system is subjected to subatmospheric pressure during the pickup and washing cycles.

As shown in Fig. 2, the inner track 5 is interrupted as at 53 at the discharge zone of the filter and similarly the track 4 so as to permit the trailing edge of each pan to swing downwardly counterclockwise directly over the cake-receiving hopper 7. Fixed to the hopper 7 is a stop 54 having an inclined rear face 55 for preventing the pans 29 from swinging through more than the desired amount. Formed on the inner track 5 is an inclined pan pickup cam surface 56 engageable by the rollers 37 as the pans pass the hopper 7 to bring the pans back to a horizontal position.

Fastened to the leading edge or side wall 32 of each pan 29 is an arched deflecting plate 57 arranged to hook over the trail side wall 33 of the preceding pan and serving to prevent the slurry fed to the filter from dropping between the pans.

Although not shown in the drawings, it is to be understood that each pan is provided with a suitable filter medium and with means for supporting such medium above the bottom of the pan. As best shown in Fig. 3, each pan is outwardly inclined so that any filtrate contained within the pan will flow under the influence of gravity into the outer end of its associated filtrate receiving pipe section 45, and hence to and through the automatic filter valve.

Attached to and surrounding the ring 41 is a link chain 58 and meshing therewith is a sprocket wheel 59 arranged to be driven by an electric motor not shown.

It should be noted that the rollers 37 are mounted beneath the trailing edge of their associated pans, whereas the rollers 38 are mounted beneath the leading edges of their associated pans and in substantial vertical alignment with the stub shafts 44.

In conclusion, it will be seen that I have provided a simple and positive connection between the outlet nipples of the pans of a rotary table filter and an automatic filter valve which permits the pans to tilt and which avoids the use of the customary swivel connections.

I claim:

1. A filter comprising: a filter pan supporting frame arranged to travel in a circular path about a fixed axis; a valve member arranged to rotate with said supporting frame about said axis and including an outwardly extending filtrate-discharging pipe section; a filtrate-receiving pipe section journaled on said supporting frame coaxially with said filtrate-discharging pipe section and in telescopic relationship therewith; a water-tight sleeve of flexible material circumscribing said pipe sections, said sleeve being sealed at one end to one of said pipe sections and sealed at its other end to the other of said pipe sections; a filtrate pan journaled on said supporting frame for rotation on the axis of said pipe sections, said pan being rigidly secured to the outer end of said filtrate-receiving pipe section and having communication therewith; means for rotating said supporting frame in a given direction; and means for tilting said filtrate pan in response to the rotation of said supporting frame.

2. A filter of the character defined in claim 1, wherein there is a plurality of said filtrate pans, symmetrically arranged about the axis of rotation of said supporting frame and similarly connected to said valve member.

3. A filter of the character defined in claim 1, wherein said supporting frame rotates about a fixed vertical axis and wherein said pipe sections extend radially of the axis of rotation of said supporting frame.

4. A filter of the character defined in claim 3, wherein the axis of said pipe sections passes through said filtrate pan adjacent its leading edge.

5. A filter of the character defined in claim 4, wherein the trailing edge of said filtrate pan is normally supported by an interrupted cam track thereby to permit said pan to tilt on its radial axis once during each complete revolution of said supporting frame.

6. A filter comprising: a stationary supporting frame; a filter table frame journaled on said supporting frame for rotation on a fixed vertical axis; a filter valve member journaled on said supporting frame coaxial with said table frame and arranged to rotate therewith, said valve member including a substantially horizontal, radially extending filtrate-discharging pipe section; a filtrate-receiving pipe section journaled on said table frame coaxially with said filtrate-discharging pipe section and in telescoping relationship therewith, said pipe sections being free to rotate relative to each other; a flexible sleeve circumscribing said pipe sections, said sleeve being sealed at one end to one of said pipe sections and sealed at its other end to the other of said pipe sections; and a filter pan fixed at its inner end to the outer end of said filtrate-receiving pipe section and having communication therewith; means for rotating said table frame; and means for tilting said filter pan on the axis of said pipe sections in response to the rotation of said table frame.

References Cited in the file of this patent

UNITED STATES PATENTS

| | | |
|---|---|---|
| 456,323 | Gibbs | July 21, 1891 |
| 938,636 | Browne | Nov. 2, 1909 |
| 978,381 | Kier | Dec. 13, 1910 |
| 2,684,158 | Delruelle | July 20, 1954 |